United States Patent [19]

Folli

[11] Patent Number: 5,757,607
[45] Date of Patent: May 26, 1998

[54] METALLIZED DIELECTRIC FILM OF VARIABLE RESISTANCE AND RELATIVE CAPACITOR

[75] Inventor: Francesco Folli, Milan, Italy

[73] Assignee: ICAR S.p.A.-Industria-Condensatori Applicazioni Elettroelettroniche, Milan, Italy

[21] Appl. No.: 744,933

[22] Filed: Nov. 6, 1996

[30] Foreign Application Priority Data

Feb. 9, 1996 [IT] Italy ............... MI96A0248

[51] Int. Cl.⁶ ....................................... H01G 4/015
[52] U.S. Cl. .................. 361/273; 361/290; 361/292
[58] Field of Search .................. 361/273, 275.1, 361/278, 280, 281, 290, 292, 301.5, 303, 305, 323, 324, 301.4; 29/25.42; 427/79

[56] References Cited

U.S. PATENT DOCUMENTS

| | | | |
|---|---|---|---|
| 3,644,805 | 2/1972 | Heywang | 317/258 |
| 4,121,274 | 10/1978 | Simson et al. | 361/273 |
| 4,477,858 | 10/1984 | Steiner | 361/273 |
| 5,019,418 | 5/1991 | Linzey et al. | 427/79 |
| 5,615,078 | 3/1997 | Hudis et al. | 361/313 |

FOREIGN PATENT DOCUMENTS

| | | | |
|---|---|---|---|
| 4311017 | 11/1992 | Japan | 361/273 |
| 06290990 | 10/1994 | Japan | |
| WO94/19813 | 9/1994 | WIPO | |

*Primary Examiner*—Kristine L. Kincaid
*Assistant Examiner*—Anthony Dinkins
*Attorney, Agent, or Firm*—Jacobson, Price, Holman & Stern, PLLC

[57] ABSTRACT

A metallized dielectric film (103, 104, 105, 106) is used for manufacturing electrical power capacitors of self-healing type. The metallization (60, 60', 601, 601'), which is obtained by known deposition techniques for zinc, aluminum or zinc-aluminum alloys, has a variable thickness of substantially decreasing profile, such that the resistance, evaluated in ohms/square $\Omega/\square$), varies from a minimum of 1 $\Omega/\square$ in the contact region (51, 51', 501), to a maximum of 60 $\Omega/\square$ (on the opposite side). The thickness of the metallization (60, 60', 601, 601') is reduced by a continuous variation of for example inverse square type.

11 Claims, 7 Drawing Sheets

METALLIZED DIELECTRIC FILM OF VARIABLE RESISTANCE AND RELATIVE CAPACITOR

BACKGROUND OF THE INVENTION

Field of the Invention

This invention relates to a metallized dielectric film used for forming electrical power capacitors of the self-healing type, and the relative capacitor.

DESCRIPTION OF THE RELATED ART

This type of capacitor is used for example in a railway environment, and is generally formed from metallized film of traditional or segmented type. It must be of low volume and weight, it is used with direct current, and is generally of high capacitance for a voltage variable between 500 and 5000 volts. In the case of dielectric yielding, a capacitor formed from a dielectric film with metallized surfaces is known to be able to isolate a possible fault zone. In this respect, the energy of the electric arc consequent on discharge removes the surrounding metallization to isolate the area of the short circuit, so enabling the capacitor to remain in service. In certain cases (high voltage, high capacitance), the discharge can be so violent as to compromise the capacitor dielectric through several successive layers. In this case the self-healing mechanism no longer functions correctly, the result being the appearance of a large region of fused material, leading to the destruction of the capacitor.

To reduce the deleterious effects deriving from a high-energy discharge, the film can be divided into "segments" which reduce the energy stored by an elementary capacitor.

The protection is achieved by disconnection of the contact between the segmented sector and the endpieces. To make the intervention mechanism more reliable the connection region can be substantially reduced to create fuses, which more easily isolate the segment. A further alternative solution, known as mosaic, is to divide the film into numerous regions connected together by fusible elements, as in the preceding case.

Dividing the capacitor into a number of elementary capacitors connected together by fuses, ie the use of segmented or mosaic film, has the advantage of preventing destruction of the capacitor which, in the case of a fault, tends to reduce its capacitance until isolation, with a small gas production and the absence of film fusion or burning, hence minimizing the explosion risk. In contrast, the losses due to the Joule effect tend to be higher than in the traditional solution, because of which the capacitor is generally unable to tolerate high-intensity currents.

The capacitance of a self-healing capacitor is known to decrease with time due to self-healing discharges. This phenomenon is more apparent with segmented or mosaic film because the various sectors themselves tend to become isolated as a result of more violent discharges and/or dielectric degradation. In addition, the demetallized regions which are formed to isolate the various sectors, these latter being connected only by the fusible bridges, result in a decrease in the facing surface, hence requiring an increase (to achieve the same capacitance) in the quantity of film to be used (with increased capacitor volume and weight).

Finally, it is known that on increasing the resistance of the metallized layer (conductive layer), the self-healing discharge energy decreases, with the possibility of again working with higher voltages, but to the detriment of the loss of capacitance, which tends to increase considerably, in the case of alternating current operation.

In addition, in applications in which the absorbed current is high, the Joule effect due to the high resistance does not enable the capacitor to be used with high currents.

SUMMARY OF THE INVENTION

To obviate the aforesaid drawbacks, a metallized film has been designed which can be operated with high voltage gradients, with lower capacitance variations and with lesser Joule effect losses than solutions of segmented or mosaic type. Moreover, in this case the capacitor can be stressed with a high-value alternating component.

An object of the present invention is therefore to provide a metallized dielectric film of variable resistance usable for direct current capacitors which at the same time is reliable from the viewpoint of pulsating current passage retention and which maintains Joule effect losses low compared with traditional self-healing capacitors.

A further object of the invention is to provide a power capacitor which, in the case of local damage following discharge, undergoes a capacitance reduction which, for equal conditions, is less than the capacitance reduction encountered in self-healing capacitors of segmented or mosaic type.

A further object is to make the formation of the metallized dielectric film of variable resistance and the manufacture of the capacitor simple and economical, without the need to use complex technology.

These objects are attained by a metallized dielectric film of variable resistance in accordance with claim 1, and a capacitor using said film in accordance with claim 10.

The dielectric film used up to the present time, generally polypropylene, is currently metallized with aluminum, zinc or aluminum-zinc alloys, with resistance values, measured in ohms/square ($\Omega/\square$), variable between 2 and 5 for aluminum and between 5 and 10 for zinc or zinc-aluminum alloy. The edges are generally reinforced to achieve better contact with the endpieces. The film resistance is measured on a square sample, the result obtained being independent of the dimensions of the square. The following relationship is valid:

R ($\Omega/\square$) =$\rho(\Omega\cdot m/x$ (m), where $\rho$ is the resistivity of the conductor material (or alloy) deposited on the dielectric, and x is the thickness of the material deposited on the dielectric. The metallized film of the invention is obtained by variable thickness metallization, where the resistance, evaluated in ohms/square ($\Omega/\square$), varies between a minimum value of 1 $\Omega/\square$ in the contact region and a maximum value of 60 $\Omega/\square$ at the opposite end by suitably reducing the metallization thickness, with a continuous variation of, for example, inverse square type such that the value of the equivalent series resistance of the capacitor or of the power dissipated by the Joule effect in the metallized region are of the same order of magnitude as the corresponding value for a capacitor of constant resistivity (of value between 2 $\Omega/\square$ and 10 $\Omega/\square$).

BRIEF DESCRIPTION OF THE DRAWINGS

The characteristics of the metallized dielectric film of variable resistance and of the relative capacitor according to the present invention will be more apparent from the description of one embodiment thereof given hereinafter by way of non-limiting example with reference to the accompanying drawings, in which.

DESCRIPTION OF THE PREFERRED EMBODIMENTS

With reference to FIGS. 1, 2, 3 and 4, the metallized dielectric films are indicated overall by 101, 102, 103, 104, each comprising a substrate 30, 30', 70, 70' of insulating material and a layer 20, 20', 60, 60' of electrically conducting material, which is grown on the insulation 30, 30', 70, 70' by known metal deposition methods. In proximity to the contact electrodes 11, 11', 51, 51' of the capacitor, the metallization of the conductive layers 20, 20', 60, 60' is grown (by known spray techniques) until an entire reinforced edge 10, 10', 50, 50' of conducting material has formed.

Figure 1:
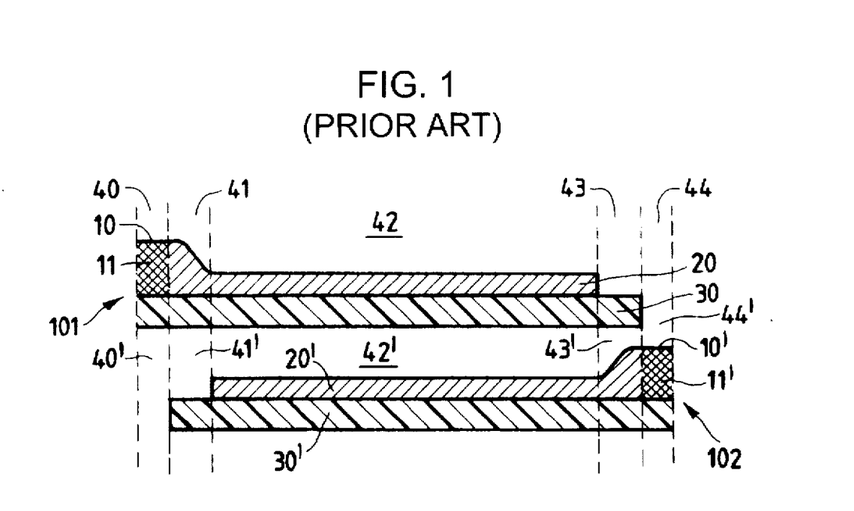
FIG. 1 is a schematic cross-section through two metallized dielectric films used as the conductive electrodes in the construction of a self-healing power capacitor of the known art.
Figure 2:
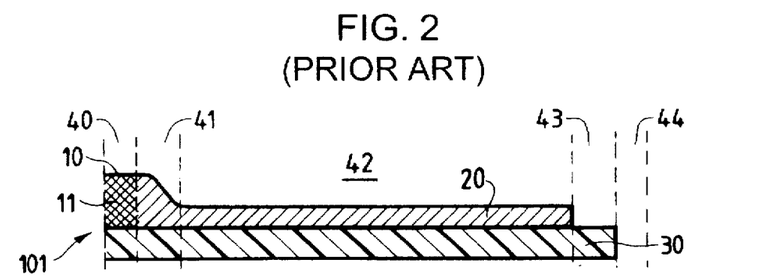
FIG. 2 is a schematic cross-section through a first metallized dielectric film of FIG. 1, of the known art.
Figure 2A:
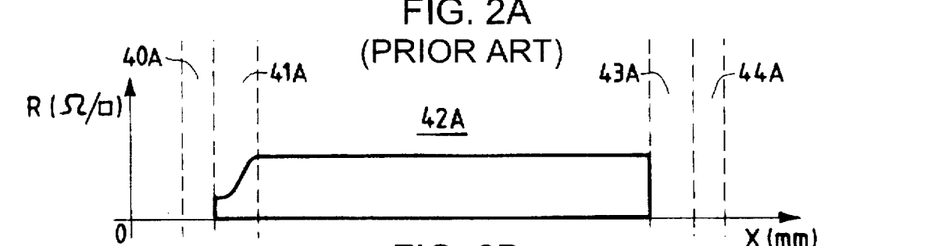
FIG. 2A is a cartesian graph showing the relationship between the resistance of a first conductive electrode of FIG. 1 of the known art, and the capacitor conductive electrode height.
Figure 2B:
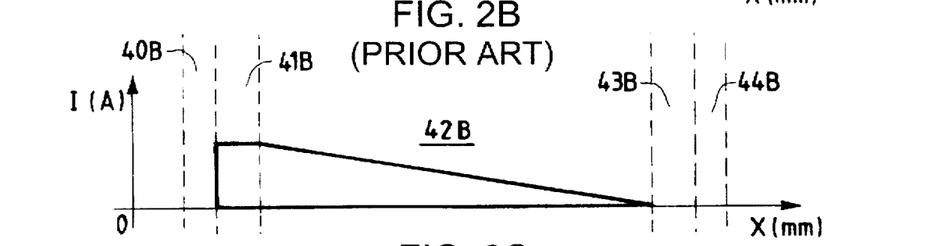
FIG. 2B is a cartesian graph showing the relationship between the intensity of the current absorbed by the first conductive electrode of FIG. 1 of the known art, and the capacitor conductive electrode height.
Figure 2C:
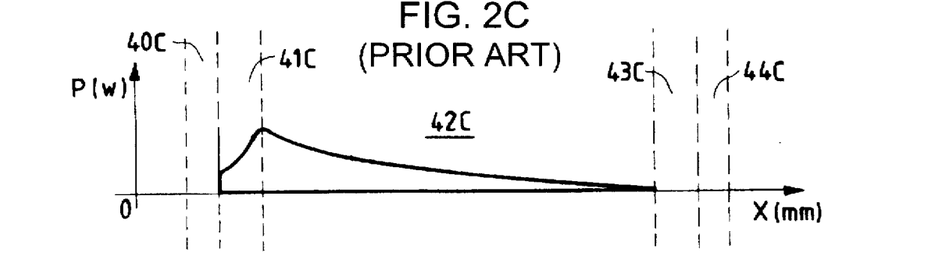
FIG. 2C is a cartesian graph showing the relationship between the power dissipated by the Joule effect in the first conductive electrode of FIG. 1 of the known art, and the capacitor conductive electrode height.
Figure 3:
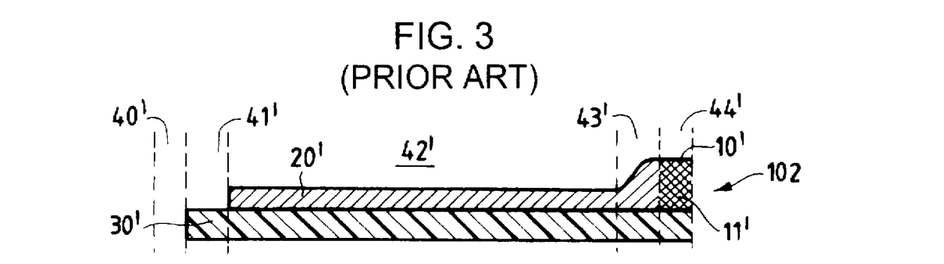
FIG. 3 a schematic cross-section through a second metallized dielectric film of FIG. 1, of the known art.
Figure 3A:
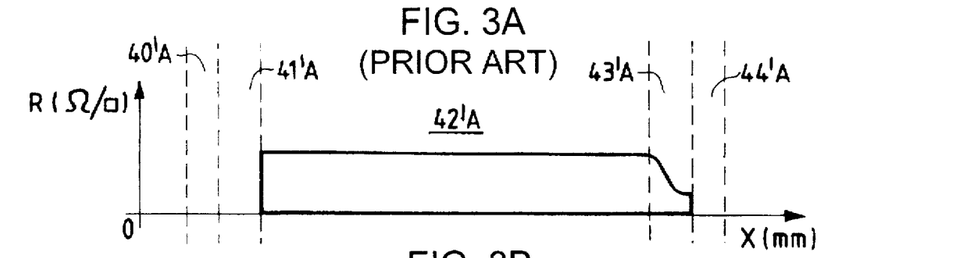
FIG. 3A is a cartesian graph showing the relationship between the resistance of the second conductive electrode of FIG. 1 of the known art, and the capacitor conductive electrode height.
Figure 3B:
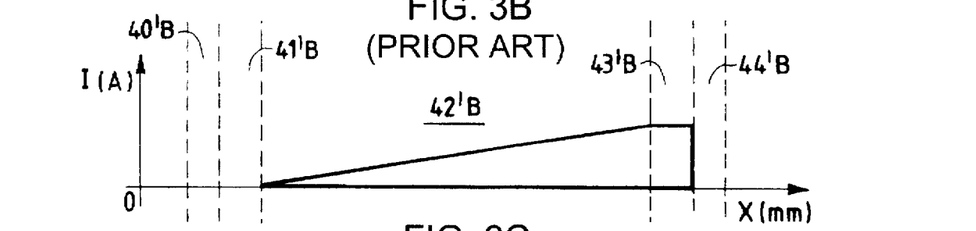
FIG. 3B is a cartesian graph showing the relationship between the intensity of the current absorbed by the second conductive electrode of FIG. 1 of the known art, and the capacitor conductive electrode height.
Figure 3C:
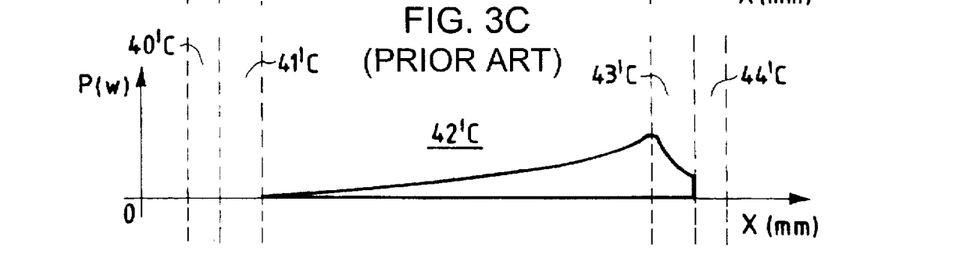
FIG. 3C is a cartesian graph showing the relationship between the power dissipated by the Joule effect in the second conductive electrode of FIG. 1 of the known art, and the capacitor conductive electrode height.

In FIGS. 1, 2 and 3 in particular, which relate to metallized dielectric films formed by the known art, 40 and 44' indicate overall two reference regions, corresponding to the contact surfaces of the capacitor first film and second film, indicated respectively by 101 and 102, in which the edges 10, 10' are reinforced with metallization. The metallization layer 20, 20' has a constant thickness (and hence a constant conductive electrode resistance, of a value between 3 and 10 ohms/square, $\Omega/\square$), depending on the height X of the capacitor conductive electrode. Two further reference regions 41 and 43' correspond respectively to a region of the first film 101 and a region of the second film 102 in which the thickness of the metallization layer 20, 20' decreases as a function of the capacitor conductive electrode height X relative to the film 101 and increases as a function of the height X relative to the film 102. A further two reference regions 42 and 42' correspond to two regions, one on the first film 101 and one on the second film 102, in which the thickness of the metallization layer 20, 20' is constant (the resistance of the conductive electrodes hence also being constant, at a value of between 3 and 10 ohms/square, $\Omega/\square$). The reference numerals 43 and 44 (or 41' and 40') indicate respectively two successive reference regions corresponding to regions of the first film 101 (or of the second film 102), in which the metallization layer 20 (or 20') is absent. Finally the dielectric material substrate of the film 101 (or 102) is indicated by 30 (or 30').

Figure 4:
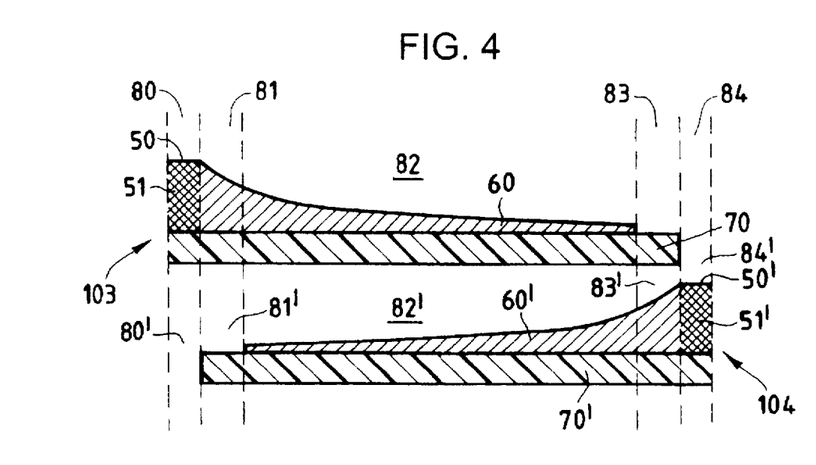
FIG. 4 is a schematic cross-section through two metallized dielectric films used as the conductive electrodes in the construction of a self-healing power capacitor, in accordance with the invention.

In FIG. 4 the thickness of the metallization layer 60, 60' decreases as a function of the capacitor conductive electrode height X in the case of the film 103 (within the regions 81 and 82), but increases, again as a function of the height X, in the case of the film 104 (within the regions 82' and 83'). The other reference regions of the film 103, which are indicated respectively by 80, 83, 84, are analogous to the regions 40, 43, 44 of the film 101 of FIG. 1, whereas those regions of the film 104 indicate by 80', 81', 84' are analogous respectively to the regions 40', 41', 44' of the film 102 of FIG. 1.

Figure 1A:
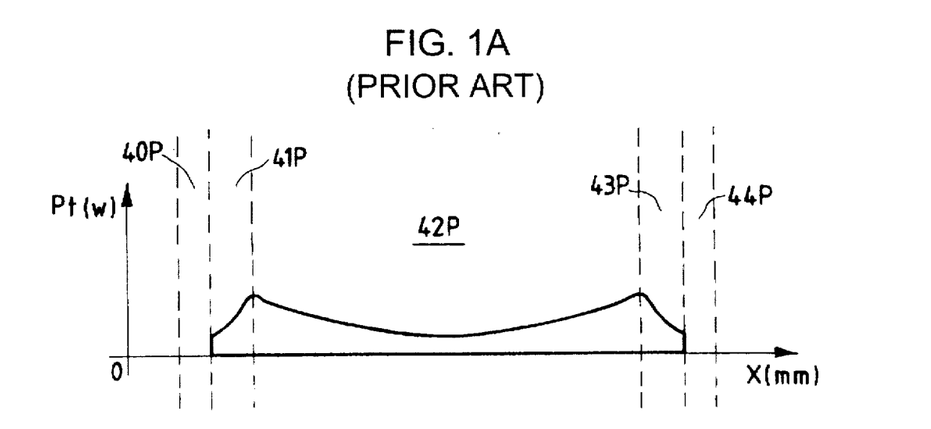
FIG. 1A is a cartesian graph showing the relationship between the sum of the powers dissipated by the Joule effect in two adjacent conductive electrodes of a self-healing power capacitor of the known art and the capacitor conductive electrode height.
Figure 4A:
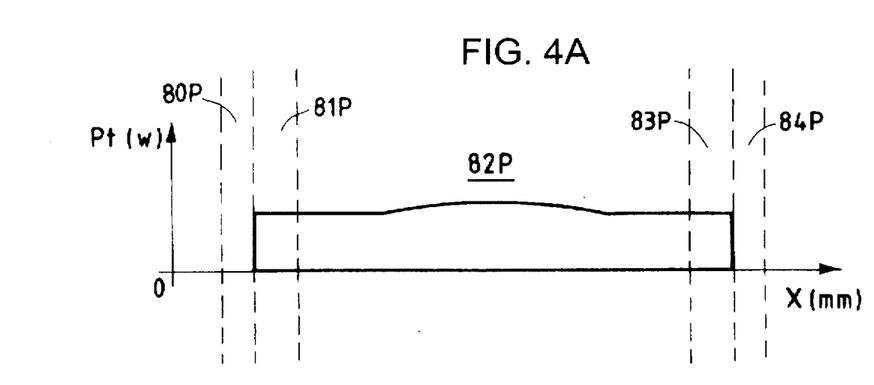
FIG. 4A is a cartesian graph showing the relationship between the sum of the powers dissipated by the Joule effect in two adjacent conductive electrodes of a self-healing power capacitor in accordance with the invention, and the capacitor conductive electrode height.
Figure 5:
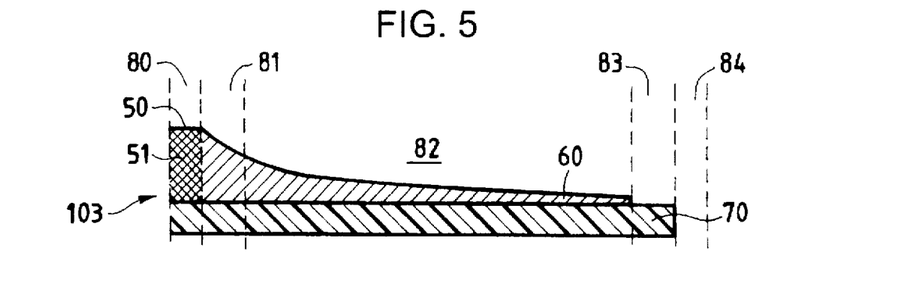
FIG. 5 is a schematic cross-section through a first metallized dielectric film of FIG. 4, in accordance with the invention.
Figure 5A:
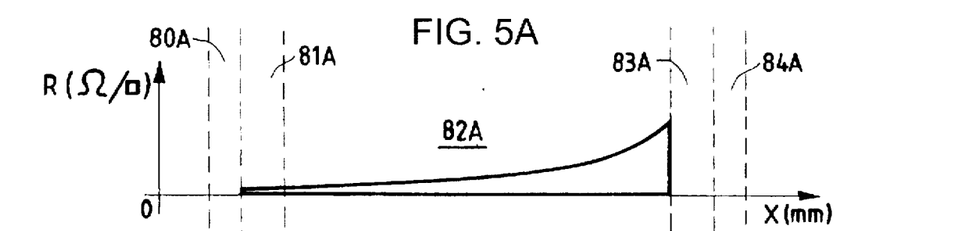
FIG. 5A is a cartesian graph showing the relationship between the resistance of a first conductive electrode of FIG. 4 in accordance with the invention, and the capacitor conductive electrode height.
Figure 5B:
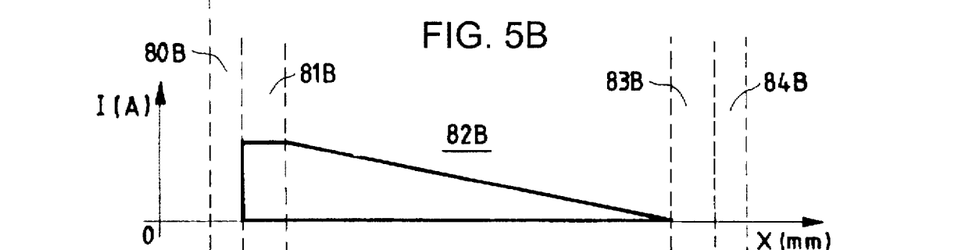
FIG. 5B is a cartesian graph showing the relationship between the intensity of the current absorbed by the first conductive electrode of FIG. 4 in accordance with the invention, and the capacitor conductive electrode height.
Figure 5C:
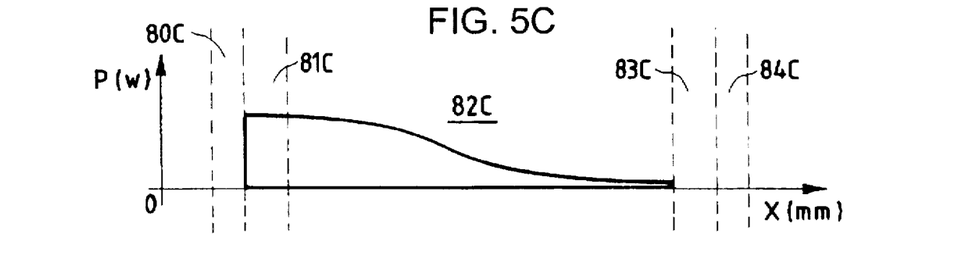
FIG. 5C is a cartesian graph showing the relationship between the power dissipated by the Joule effect in the first conductive electrode of FIG. 4 in accordance with the invention, and the capacitor conductive electrode height.
Figure 6:
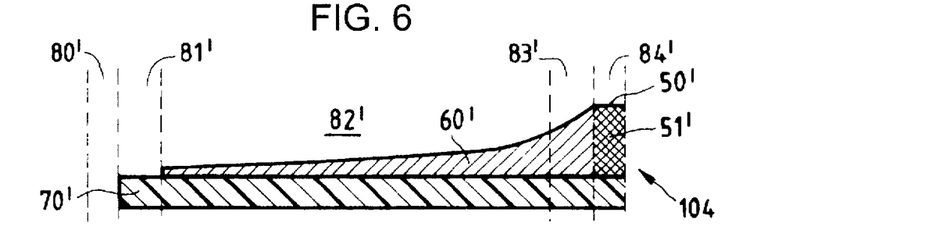
FIG. 6 is a schematic cross-section through a second metallized dielectric film of FIG. 4, in accordance with the invention.
Figure 6A:
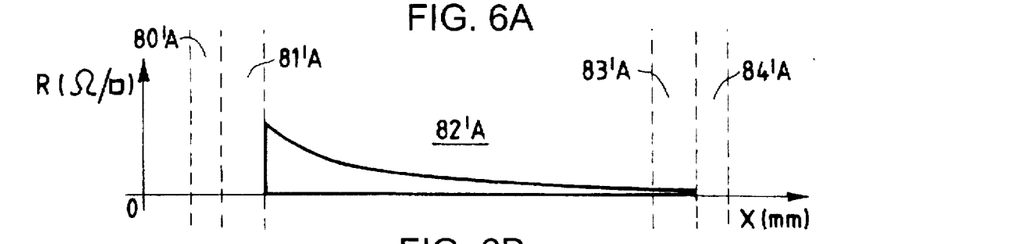
FIG. 6A is a cartesian graph showing the relationship between the resistance of the second conductive electrode of FIG. 4 in accordance with the invention, and the capacitor conductive electrode height.
Figure 6B:
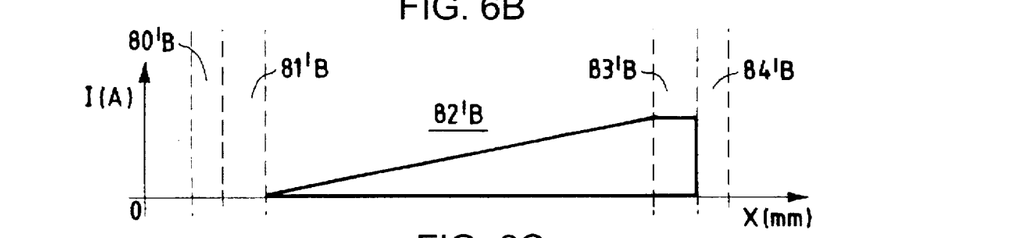
FIG. 6B is a cartesian graph showing the relationship between the intensity of the current absorbed by the second conductive electrode of FIG. 4 in accordance with the invention, and the capacitor conductive electrode height.
Figure 6C:
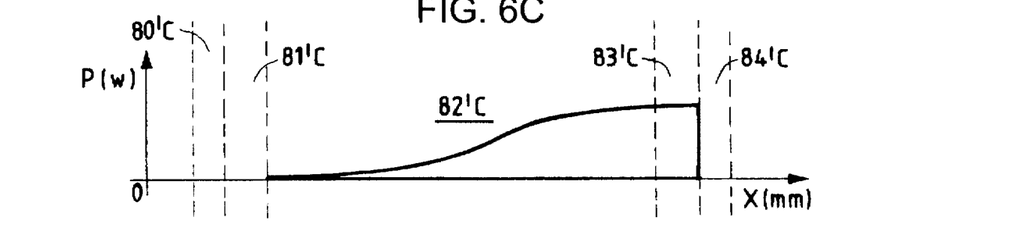
FIG. 6C is a cartesian graph showing the relationship between the power dissipated by the Joule effect in the second conductive electrode of FIG. 4 in accordance with the invention, and the capacitor conductive electrode height.

With reference to the Cartesian graphs of FIGS. 1A and 4A, the vertical axis, indicated by Pt, represents the total power (in watts, W) dissipated by the Joule effect in the two adjacent conductive electrodes of a capacitor constructed with the two metallized dielectric films 101, 102 (or 103, 104). The horizontal axis, indicated by X, represents the height of the capacitor conductive electrode, relative to the films 101, 102 (or 103, 104). On the same graphs, 40P, 41P, 42P, 43P, 44P (or 80P, 81P, 82P, 83P, 84P) represent the reference regions corresponding to the reference regions 40, 41, 42, 43, 44 of the film 101 of FIG. 1 (or the reference regions 80, 81, 82, 83, 84 of the film 103 of FIG. 4) and to the reference regions 40', 41', 42', 43', 44' of the film 102 of FIG. 1 (or the reference regions 80', 81', 82', 83', 84' of the film 104 of FIG. 4).

With reference to the cartesian graphs of FIGS. 2A, 2B, 2C, 3A, 3B, 3C, 5A, 5B, 5C, 6A, 6B, 6C, that vertical axis indicated by R represents the resistance (in ohms/square, $\Omega/\square$) of the conductive electrodes of the capacitor constructed with the films 101, 102 (or 103, 104), that indicated by I represents the intensity of the current (in amps, A) absorbed by the conductive electrodes, and that indicated by P represents the power (in watts, W) dissipated in the conductive electrodes. The horizontal axis, indicated by X, represents the height of the capacitor conductive electrode relative to the films 101 and 102 (or 103, 104). The reference regions 40A, 41A, 42A, 43A, 44A (or 80A, 81A, 82A, 83A, 84A) and with them the respective reference regions 40B, 41B, 42B, 43B, 44B (or 80B, 81B, 82B, 83B, 84B), and the reference regions 40C, 41C, 42C, 43C, 44C (or 80C, 81C, 82C, 83C, 84C) correspond respectively to the reference regions 40, 41, 42, 43, 44 of the film 101 of FIG. 1 (or 80, 81, 82, 83, 84 of the film 103 of FIG. 4). The reference regions 40'A, 41'A, 42'A, 43'A, 44'A (or 80'A, 81'A, 82'A, 83'A, 84'A) and with them the respective reference regions 40'B, 41'B, 42'B, 43'B, 44'B (or 80'B, 81'B, 82'B, 83'B, 84'B), and the reference regions 40'C, 41'C, 42'C, 43'C, 44'C (or 80'C, 81'C, 82'C, 83'C, 84'C) correspond respectively to the reference regions 40', 41', 42', 43', 44' of the film 102 of FIG. 1 (or 80', 81', 82', 83', 84' of the film 104 of FIG. 4).

Figure 7:
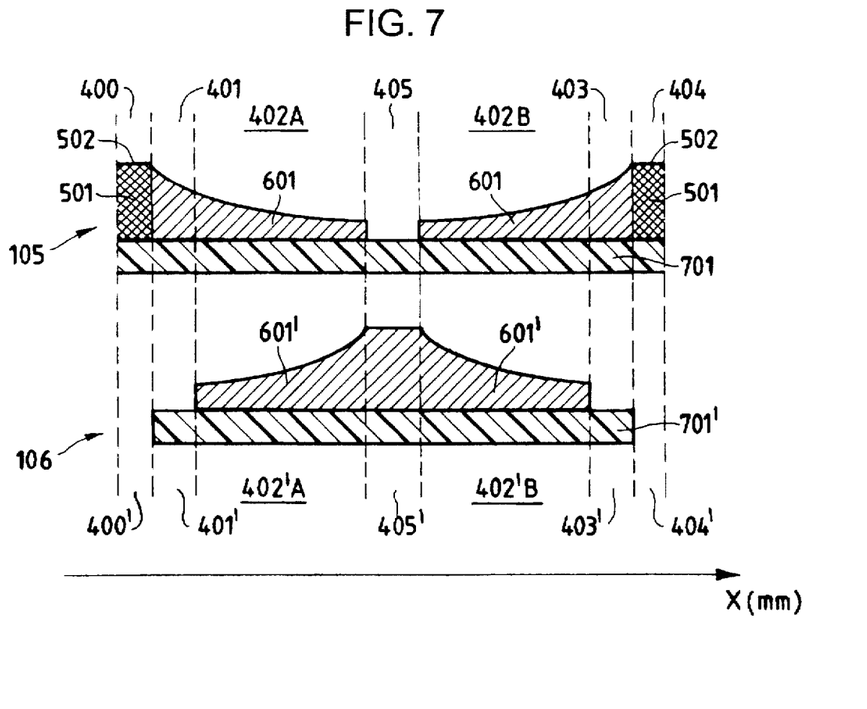
FIG. 7 is a schematic cross-section through two metallized dielectric films used as the conductive electrodes in the construction of an electrical circuit equivalent to two series-connected self-healing power capacitors, in accordance with the invention.

With particular reference to FIG. 7, 501 indicates the contact region of the capacitor contact electrodes, 601, 601' indicate the metallization layers, 701, 701' indicate the dielectric material substrates, 400, 404 represent two reference regions in which the thickness of the contact metallization 501 of the reinforced edge 502 of a first film 105 (used for constructing capacitors in series) is constant, 401, 402A indicate two reference regions in which the thickness of the metallization 601 of a first film 105 decreases as a function of the height X of the capacitor conductive electrode, 402B, 403 indicate two reference regions in which the thickness of the metallization 601 of the film 105 increases as a function of the height X of the capacitor conductive electrode, and 405 indicates a reference region in which the metallization 601 of the film 105 is absent. The reference numeral 701 indicates the substrate of the film 105, and 701' indicates the substrate of the film 106. The thickness of the metallization 601' of the film 106 is constant in the region 405', decreases as a function of the height X of the capacitor conductive electrode in the reference region 402'B, and increases as a function of the height X of the capacitor conductive electrode in the reference region 402'A. The metallization 601' of the film 106 is absent in the reference regions 400', 401', 403', 404'. The method for manufacturing the power capacitor of the present invention consists of superposing the two metallized dielectric films 103, 104 such that the substrates 70, 70' and the metallization regions 60, 60' are mutually inverted and are slightly offset in the vertical direction. The films 103, 104 arranged in this manner are rolled together along the shorter side. A cylinder is obtained, this constituting the actual capacitive element.

The metallized dielectric films 103, 104 can also be advantageously employed when two or more capacitors connected in series have to be used (as in the arrangement illustrated in FIG. 7, in which the films concerned are indicated by 105, 106). The insulating substrate 70, 70', 701, 701' is preferably a plastics material or paper, the metallization 60, 60', 601, 601' of the upper layer and of the reinforced edge 50, 50', 502 consisting of aluminum, zinc or an aluminum-zinc alloy. From the experimental results obtained for all the samples tested, it has been found that an optimum profile of the metallization 60, 60', 601, 601' is of continuous type, decreasing from the contact region (51, 51', 501), this being excluded, as far as the free edge of the film 103, 104, 105, 106 on the opposite side. A metallization 60, 60', 601, 601' of this type has a resistance, measured on a square surface sample (so that the result is independent of the sample dimensions), which increases as a function of the height X of the capacitor conductive electrode. In particular, it has been noted that in the case of an aluminum metallization 60, 60', 601, 601', the optimum resistance value, measured in ohms/square ($\Omega/\square$) varies from a minimum of 1 $\Omega/\square$ to a maximum of 4 $\Omega/\square$, in the immediate vicinity of the contact region 51, 51', 501 (in correspondence with the dashed line separating the reference regions 80A, 81A, or 80'A, 81'A, or 400, 401; 403, 404, in FIGS. 5A, 6A, 7). In the central regions 81A, 82A, 82'A, 83'A, 402A/402'A, 402'B, 401, 403 of the films 103, 104, 105, 106 the optimum resistance value varies from a minimum of 5 $\Omega/\square$ to a maximum of 15 $\Omega/\square$, whereas in the region with a free edge (in correspondence with the dashed lines separating the reference regions 82A, 83A, or 81'A, 82'A, or 402A, 405, or 402B, 405, or 401', 402'A, or 402'B, 403') it varies from a minimum of 10 $\Omega/\square$ to a maximum of 20 $\Omega/\square$.

If the plastics or paper substrate 70, 70', 701, 701'is metallized with zinc or with an aluminum-zinc alloy, the optimum resistance values vary from a minimum of 2 $\Omega/\square$ to a maximum of 7 $\Omega/\square$ in the contact regions, from a minimum of 15 $\Omega/\square$ to a maximum of 50 $\Omega/\square$ in the central regions of the films 103, 104, 105, 106, and from a minimum of 20 $\Omega/\square$ to a maximum of 60 $\Omega/\square$ in the regions with a free edge. The metal deposition on the substrate 70, 70', 701, 701' must hence be such that the resistance values measured in ohms/square ($\Omega/\square$) in the various reference regions of the films 103, 104, 105, 106 lie within the aforesaid ranges. In particular, the maximum resistance value of 60 $\Omega/\square$ should not be exceeded in order to enable the capacitor to operate with an impressed current alternating component of sufficiently high value, while at the same time limiting corrosion phenomena. The variation in the metallization/thickness 60,60', 601, 601' is preferably a continuous variation (for example of the inverse square type as a function of the height X of the capacitor conductive electrode), so that the equivalent series resistance of the capacitor (or the power dissipated by the Joule effect in the metallization region 60, 60', 601, 601') is of the same order of magnitude as the series resistance (or the dissipated power) of a constant resistance capacitor pertaining to the known art (as can be seen from the graphs of FIGS. 4A, 5A, 5C, 6A, 6C when compared with the graphs of FIGS. 1A, 2A, 2C, 3A, 3C respectively). In particular, according to a preferred but non-limiting embodiment, the metallization resistance, measured across a square sample such that the result is independent of the sample dimensions, increases continuously as a function of the conductive electrode height X, such that if any two points on the curve are taken, the difference between the larger and smaller resistance values corresponding to said points, divided by the distance between the two points, evaluated along the capacitor conductive electrode height axis X is in all cases less than the ratio between the number 100 and the total height of the dielectric substrate 70, 70', 701, 701'. In symbols, the following condition must be satisfied:

$$\delta(R)/\delta(h) < 100/H$$

where δ is the partial derivative symbol, R is the difference between the greater and lesser resistance values (measured in ohms/square, Ω/□), corresponding to the points chosen on the curve R(Ω/□);X(mm), h is the conductive electrode height between said two points (in mm. millimetres), and H is the total height of the dielectric substrate 70, 70', 701, 701' (in mm).

In this manner, the results obtained experimentally (shown on the graphs of FIGS. 4A, 5A, 5B, 5C, 6A, 6B, 6C) show that the metallized film 103, 104, 105, 106 of variable resistance, according to the invention, has better electrical characteristics than film of the known art used for manufacturing self-healing direct current capacitors.

In particular, compared with the known art, the dielectric rigidity and the working gradient of the capacitor are greater because the energy relative to healing discharges is reduced. The sum of the thicknesses of the metallization 60, 60', 601, 601' on the two conductive electrodes is relatively small, hence the resistance is substantially high compared with the known art. Because of all this, the effects of the healing discharge are minimal, in the sense that the crater which forms consequent on the discharge is of small dimensions and the layers adjacent to the discharge region become involved to a lesser extent and only after a longer time period.

The aforesaid electrical characteristic also results in a variation of capacitance with time which, in capacitors according to the invention, is less than other arrangements used (segmented or mosaic film), it hence being advantageous to use a metallized film of variable resistance (according to the invention) for direct current, even with a superposed alternating component (ripple) of high value. Moreover, the film 103, 104, 105, 106 obtained in this manner has a pulse current retention equal to or greater than traditional techniques, due to the fact that the thickness of the metallization 60, 60', 601, 601' in the contact region 51, 51', 501 is higher.

The power dissipated by the conductive electrodes in a capacitor comprising the film of the invention is of the same order of magnitude as that obtained using a capacitor of traditional type, and hence less than that of an analogous self-healing capacitor of the segmented or mosaic type (the comparison can be made observing the graphs of FIGS. 1A and 4A).

From FIG. 4A it can also be seen that a conductive electrode dissipated power of practically constant value at all points of the dielectric substrate can be obtained, it hence under certain conditions being possible to achieve a better situation from the thermal viewpoint than the known art.

Finally, the method of metalizing the variable resistance film is less complex from the technological aspect than an analogous method used for a segmented or mosaic film.

The characteristics of the metallized dielectric film of variable resistance and the relative capacitor according to the present invention are apparent from the aforegoing description, as are their advantages over the known art.

In particular, these are:
- increased dielectric rigidity and working gradient;
- reduction in capacitance variation with time;
- increased pulse current retention;
- reduction in dissipated power at the capacitor conductive electrodes;
- constant dissipated power, independent of the insulating substrate;
- easier metallization;
- possibility of operating with a sufficiently high alternating current component, while at the same time limiting corrosion phenomena.

Modifications can be made in the embodiments of the invention described herein without leaving the principles on which the inventive idea is based, and in the practical implementation of the invention the materials and dimensions can be chosen according to technical requirements.

For example, two metallized dielectric films according to the invention could be used, coupled by the well known arrangement of series type to obtain an electrical circuit equivalent to two capacitors in series.

I claim:

1. A metallized dielectric film used for manufacturing electrical power capacitors of self-healing type, comprising at least one substrate of dielectric material, and at least one metallized surface covered by at least one electrically conducting material deposited by traditional methods and terminating in regions of generally thick metallization located in proximity to capacitor contact regions, characterised in that the thickness of the electrically conducting material deposited on said surface, which forms one of the conductive electrodes of said capacitor, varies continuously and decreasingly as a function of a linear dimension (X) of the said one of the conductive electrodes taken in a predetermined reference direction, starting from said contact region and towards a region in proximity to one of the edges of said substrate.

2. A metallized dielectric film as claimed in claim 1, characterised in that said substrate consists of plastics material or paper, said surface being metallized with aluminum.

3. A metallized dielectric film as claimed in claim 2, characterised in that said resistance increases, as a function of said linear dimension (X) in said predetermined direction, within the range corresponding to at least one portion of the conductive electrode, in such a manner as to assume values lying within the range from 1 ohm/square to 4 ohms/square in proximity to said contact regions, values lying within the range from 10 ohms/square to 20 ohms/square in proximity to an edge of said substrate, and values lying within the range from 5 ohms/square to 15 ohms/square in proximity to the point corresponding to half the height of the capacitor conductive electrode.

4. A metallized dielectric film as claimed in claim 1, characterised in that said substrate consists of plastics material or paper, said surface being metallized with zinc or an aluminum-zinc alloy.

5. A metallized dielectric film as claimed in claim 4, characterised in that said resistance increases, as a function of said linear dimension (X) in said predetermined direction, within the range corresponding to at least one portion of the conductive electrode, in such a manner as to assume values lying within the range from 2 ohms/square to 7 ohms/square in proximity to said contact regions, values lying within the range from 20 ohms/square to 60 ohms/square in proximity to an edge of said substrate, and values lying within the range from 15 ohms/square to 50 ohms/square in proximity to the point corresponding to half the height of the capacitor conductive electrode.

6. A capacitor consisting of at least two metallized dielectric films, each of said films being formed in accordance with claim 1, characterised in that said two metallized dielectric films are situated in adjacent positions offset by a distance corresponding to the thickness of said contact regions, the contact region of a first film of said films being positioned on the opposite side to the other of the contact regions of a second film of said films in a longitudinal direction of the films, said first film and second film forming a first and a second ones of the conductive electrodes of the capacitor, wherein the mathematical function representing the thickness of the electrically conducting material deposited on said surface of the first film varies continuously and decreasingly with said linear dimension (X) of the capacitor conductive electrodes taken in said predetermined direction, wherein the mathematical function representing the thickness of the electrically conducting material deposited on another of said surface of the second film varies continuously and increasingly with said linear dimension (X) of the capacitor conductive electrodes in said predetermined direction, said variations both following the same mathematical relationship.

7. A capacitor as claimed in claim 6, characterised by being formed in accordance with the known circuit arrangement of series type, in which the electrical parameters and characteristics are equivalent to the electrical parameters and characteristics of two series-connected capacitors of the series type.

8. A metallized dielectric film as claimed in claim 1, characterised by being formed in accordance with the known circuit arrangement of series type.

9. A metallized dielectric film used for manufacturing electrical power capacitors of self-healing type, comprising at least one substrate of dielectric material, and at least one metallized surface covered by at least one electrically conducting material deposited by traditional methods and terminating in regions of generally thick metallization located in proximity to capacitor contact regions, characterised in that the mathematical function relative to the resistance of said metallized surface (60 60') varies continuously and increasingly as a function of a linear dimension (X) of said surface, which forms one of the capacitor conductive electrodes, in a predetermined direction starting from said contact regions and towards one of the edges of said substrate, said resistance being measured across a square sample of the metallized surface, such that the result is independent of the dimensions of the film.

10. A metallized dielectric film as claimed in claim 9, characterised in that said resistance, evaluated in ohms/square, varies from a minimum of 1 ohm/square in correspondence with said contact regions to a maximum of 60 ohms/square in correspondence with one of the edges of said substrate.

11. A metallized dielectric film as claimed in claim 9, characterised in that the mathematical function representing the resistance of said metallized surface increases, as a function of said linear dimension (X) along said predetermined direction, such that for any two points on said function within a range corresponding to at least one portion of the conductive electrode, a ratio of the distance between resistance values at said points to the linear distance between said points is less than the inverse ratio of a dimension of said substrate to the number 100.

* * * * *